US009064358B2

(12) United States Patent
Lidror

(10) Patent No.: US 9,064,358 B2
(45) Date of Patent: Jun. 23, 2015

(54) PORTABLE ELECTRONIC PARKING PERMIT TAG AND A METHOD FOR USING THEROF

(76) Inventor: Ofer Lidror, Tel Aviv (IL)

(*) Notice: Subject to any disclaimer, the term of this patent is extended or adjusted under 35 U.S.C. 154(b) by 152 days.

(21) Appl. No.: 13/127,747

(22) PCT Filed: Nov. 9, 2009

(86) PCT No.: PCT/IL2009/001051
§ 371 (c)(1),
(2), (4) Date: May 12, 2011

(87) PCT Pub. No.: WO2010/052719
PCT Pub. Date: May 14, 2010

(65) Prior Publication Data

US 2011/0210827 A1 Sep. 1, 2011

(30) Foreign Application Priority Data

Nov. 10, 2008 (IL) ......................................... 195208

(51) Int. Cl.
*H04Q 5/22* (2006.01)
*G07C 1/30* (2006.01)
*G07B 15/02* (2011.01)

(52) U.S. Cl.
CPC . *G07C 1/30* (2013.01); *G07B 15/02* (2013.01)

(58) Field of Classification Search
CPC ....... G07B 15/02; G08G 1/142; G08G 1/146; G08G 1/149; G07C 1/30
See application file for complete search history.

(56) References Cited

U.S. PATENT DOCUMENTS

| | | | | |
|---|---|---|---|---|
| 5,343,237 | A | 8/1994 | Morimoto | |
| 5,476,338 | A | 12/1995 | Alberts | |
| 5,525,991 | A * | 6/1996 | Nagura et al. | 340/10.51 |
| 6,275,157 | B1 * | 8/2001 | Mays et al. | 340/572.5 |
| 6,493,676 | B1 * | 12/2002 | Levy | 705/13 |
| 6,559,776 | B2 | 5/2003 | Katz | |
| 6,819,262 | B2 | 11/2004 | Moser | |
| 7,791,501 | B2 * | 9/2010 | Ioli | 340/932.2 |
| 2003/0132840 | A1 * | 7/2003 | Bahar | 340/541 |
| 2005/0057373 | A1 * | 3/2005 | Noguchi | 340/932.2 |
| 2005/0270178 | A1 * | 12/2005 | Ioli | 340/932.2 |
| 2008/0209781 | A1 | 9/2008 | Mortensen | |
| 2008/0231470 | A1 * | 9/2008 | Ioli | 340/932.2 |
| 2009/0069040 | A1 * | 3/2009 | Wiesmuller et al. | 455/466 |

(Continued)

FOREIGN PATENT DOCUMENTS

| | | |
|---|---|---|
| EP | 0 952 557 | 10/1999 |
| WO | 03/058562 | 7/2003 |

(Continued)

*Primary Examiner* — Benjamin C Lee
*Assistant Examiner* — Rajsheed Black-Childress
(74) *Attorney, Agent, or Firm* — Roach Brown McCarthy & Gruber, P.C.; Kevin McCarthy

(57) ABSTRACT

A portable electronic parking permit tag for vehicles transporting disabled persons, which comprises (a) a memory module for storing data regarding the person(s) allowed to activate the tag, in which the stored data represents at least the personal biometric information of each of the person(s); (b) a biometric identification module for obtaining biometric data of the person trying to activate the tag; (c) a processing unit for operating the tag according to the obtained biometric data; (d) at least one display unit for indicating the status of the tag, whether activated or deactivated; (e) means for deactivating the tag; and (f) means for powering the tag.

25 Claims, 4 Drawing Sheets

(56) References Cited

U.S. PATENT DOCUMENTS

| | | | | |
|---|---|---|---|---|
| 2011/0037620 | A1* | 2/2011 | Paun | 340/932.2 |
| 2011/0099126 | A1* | 4/2011 | Belani et al. | 705/418 |

FOREIGN PATENT DOCUMENTS

| | | |
|---|---|---|
| WO | 2005/086097 | 9/2005 |
| WO | 2005/109348 | 11/2005 |

* cited by examiner

Front view

Side view

Top view

PORTABLE ELECTRONIC PARKING PERMIT TAG AND A METHOD FOR USING THEROF

REFERENCE TO CO-PENDING APPLICATIONS

Priority is claimed (1) (a) as a continuation-in-part of PCT/IL2009/001051, filed on Nov. 9, 2009; and (b) as a 371 international of PCT/IL2009/001051, filed on Nov. 9, 2009; and (2) wherein PCT/IL2009/001051 further claims priority to Israeli patent application serial number 195208, filed on Nov. 10, 2008.

FIELD OF THE INVENTION

The present invention relates to the field of vehicle parking permits for disabled persons. More specifically, the invention relates to an automated electronic identification system for preventing the abuse and forging of handicap parking permits for vehicles, such as tags or badges.

BACKGROUND OF THE INVENTION

The increasing amount of motor vehicles on the roads around the world is a topic of concern. The on growing numbers of vehicles have created a major parking problem worldwide. The present situation in most major cities is a severe shortage of parking spaces and high parking fees. Since every country has a law providing disabled parking permits that allow persons with either long-term or temporary mobility impairment to park in designated handicapped parking spaces (and in places that parking is normally forbidden to the public) at all public and private facilities, parking permits are being forged or abused by the falsifier in order to gain a convenient and free parking space. For example, a phenomenon of abusing disabled parking badges is taking place in the form of using a handicap badge by other unauthorized family members, or other forgers as well as using a handicap badge of a person who desisted.

The present official issued permit tags consist of the widely used wheelchair symbol which is usually printed on a tag or a badge made of plastic or paper, making it easy to copy and fake. In order to save parking fees, forgers are used to park in places that are forbidden for ordinary people but are allowed to handicapped people. As a result, municipal authorities around the world are losing an enormous amount of income as a result of the situation where a substantial percentage of the handicap parking is in fact done by forged parking tags.

Furthermore, If forgers sometimes make a high-quality copy of a genuine parking permit, such that a parking officer inspecting a fake parking permit will find it hard to distinguish from a genuine one. Even if the parking officer is suspecting a fake parking permit, in most cases the officer has a cumbersome way or even has no way of verifying the suspicions and validating if the permit is genuine. Thus, a parking permit forger benefits a free and convenient parking space from the present situation with practically very small chances of being caught in his felony, leaving the needy person without a parking space as the law requires. As a result, persons with handicap parking tag are forced to park their cars on sidewalks, bus stops or near fire taps, making the public environment disordered and dangerous.

In the prior art, several attempts where made in order to prevent from unauthorized drivers or vehicles to occupy a parking place dedicated to handicapped persons, such as U.S. Pat. No. 5,476,338, which discloses a barrier apparatus. However solutions of this sort require complicated structures to be built in the parking place. Furthermore, it is limited only to specific parking places, where in some countries, such as Israel, vehicle carrying legal handicapped tag can park almost everywhere.

Some others prior art relates to improvements in the parking permit, as in US application No. 2008/0209781 which discloses a display device of disabled parking permit and in U.S. Pat. No. 6,819,262 which describes a parking indication sign for vehicles of disabled persons, in order to avoid parking near the door of a vehicle of a handicapped person. However, both inventions cannot assure the parking permit is not abused by an unauthorized person.

Other prior art relates to systems for identifying parking violations with no correlation to handicapped parking permits, such as U.S. Pat. No. 5,343,237 which discloses a system for detecting an illegally parked vehicle using a TV camera, and U.S. Pat. No. 6,559,776 which describes a parking status and control system using a vehicle presence detector and a parking meter.

It is therefore an object of the present invention to prevent handicapped parking permit of being forged by providing a system and an apparatus for electronically identifying and clearly distinct a permitted driver or user of a motor vehicle who is parking, from a non-permitted one.

It is a further object of the present invention to identify a permitted person specifically, e.g. the handicapped person or his authorized representative, in real time parking.

It is yet a further object of the present invention to prevent the forgery of a disabled person's permit.

It is yet a further object of the present invention to distinct between a permanent permit and from a temporary one.

SUMMARY OF THE INVENTION

The present invention is a portable electronic parking permit tag or unit for vehicle, preferably, but not limitatively, directed for disabled parking permit that automatically recognize authorized persons and identify legal parking space usage. The portable tag, comprises: a) a memory module (e.g., flash memory) for storing data regarding the person(s) allowed to activate the tag, in which the stored data represent at least the personal biometric information of each of the person(s); b) a biometric identification module for obtaining biometric data of the person trying to activate the tag; c) a processing unit for operating the tag according to the obtained biometric data; d) at least one display unit for indicating the status of the tag, whether activated or deactivated; e) means for deactivating the tag; and f) means for powering the tag.

According to one embodiment of the invention, the tag further comprises communication means for allowing uploading or downloading data to the memory module regarding the person(s) allowed to activate the tag. Preferably, the communication means are wireless communication means, wired communication means or combination of both. Data can be uploaded to the tag from a server or a database preloaded or updated with the personal and biometric information of each of the allowed persons, using either the communication means or directly in dedicated service stations operated by the authorities.

According to an embodiment of the invention, the stored data in the memory module further comprising personal details and parking permission for each person allowed activating the tag.

Once a user is activating the tag, the system, which is pre-loaded with the authorized user's data, i.e., biometric identification, personal information and parking permissions, compares the two data sets and decides upon approval or disapproval resulting in triggering a plurality of light sources to emit light and state the condition of operation. The state will be 'on' or 'approved use', if there is a positive match, and will result in a specific light color of the plurality of light sources, appropriate display on the display unit, and optionally with a voice (or sound) announcement. The state will be 'off' or 'disapproved use' if there is no match, and will result in different light color of the plurality of light sources (or the plurality of light sources will remain un-triggered), appropriate display on the display unit, and optionally with a voice (or sound) announcement. In this manner, once a parking officer or any other citizens are inspecting a vehicle, they can easily identify whether an authorized person is displaying the parking permit or not. The software embedded in the parking permit tag or unit may include data which is adapted to the country, city and their corresponding parking permits. This data may be programmed using the operation software of the proposed parking permit unit. In addition, the parking permit unit will include the data of the authorized person (such as specific addresses, rate of disability, expiration dates), as well as visible signs that can reflect specific selected data. In addition, the operating software will be protected and capable of connecting, via highly secured data channels, to updated municipal, national or international databases, for seeking and verifying data and for data updates. Software updates and installation may be done using a USB connection via a USB cable that can be used also for charging the battery (using a 12 Volt plug) of the parking permit tag or unit, to be used for the long run.

According to one embodiment of the invention, the means for deactivating the tag is a movement detector. The movement detector may forward the data (such as velocity or acceleration) to the operating software for evaluating whether a received movement relates to actual parking termination, or just to false movement, such as wind, a hit by another vehicle or a swing. Additionally, a GPS or a digital compass may be used to verify any true movement before a decision regarding a false movement is made. Preferably, the movement detector implemented in the device will terminate the operation of the device when there is any movement, which indicates there is no parking position anymore.

Preferably, the means for powering the tag is independent battery, rechargeable battery, plug for allowing receiving power from external power source, such as a battery of a vehicle, or combination of two or more of them.

According to an embodiment of the invention, at least one of the display units display information regarding the person activated the tag and the corresponding parking authorization. Preferably, the information is displayed electronically according to the data stored in the memory module. Alternatively, the information is printed or scribed on the faceplate of the tag.

Preferably, the electronic parking permit unit is comprised of a casing with a wheelchair driver symbols on its faceplate or rear panel, an array of plurality of light sources (such as LEDs) or a light source panel placed behind the wheelchair driver symbol, for lighting the tag whenever active. The parking permit unit may include additional symbols and LEDs in different colors, whenever required. The array of LEDs may be used also to indicate the state of the parking permit unit and to illustrate the initialization process when activated. The parking permit unit may be mounted on an appropriate stand, which may be used also for storing it.

According to another embodiment of the invention, the tag further comprising remotely communication means for wirelessly communication with a remote server, having a database of all parking authorized persons and all parking spaces. Preferably, the remotely communication means is cellular module. Optionally, a navigation module, such as Global Positioning System (GPS) or GALILEO module can be incorporated to the tag for providing the actual position of the vehicle using the tag. Preferably, the tag unit and its suitable software can be connected as an added module to parking services companies and authorities databases.

Optionally, the tag further comprises a RF (or other wireless technologies, such as WiFi etc.) identification tag.

BRIEF DESCRIPTION OF THE DRAWINGS

The foregoing and other objects of this invention, the various features thereof, as well as the invention itself, may be more wholly understood from the following description, when read together with the associated drawings, described as follows:

FIG. 2A—front view; FIG. 2B—side view; FIG. 2C—top view; FIG. 2D—rear view; FIG. 2E—a schematic view of inside the device; and FIG. 2F—a view of the device in a stand.

DETAILED DESCRIPTION OF PREFERRED EMBODIMENTS

Figures 1A, 1B:
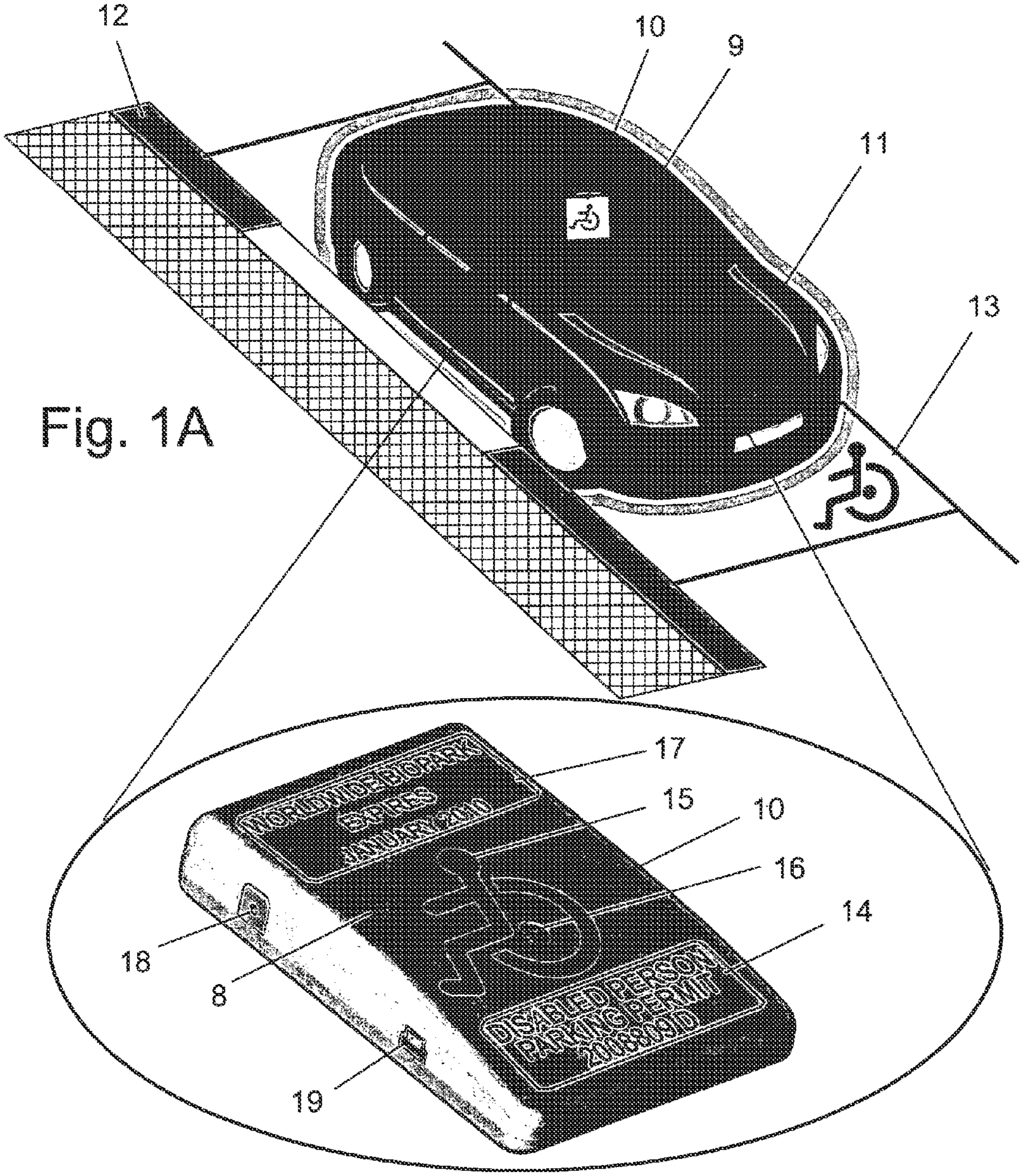
FIG. 1A is a perspective view of a vehicle parked near a pavement with the electronic parking permit display unit adjacent to the front window, with an enlarged section of the electronic parking permit.
FIG. 1B is a magnification of the parking permit unit of FIG. 1A, according to an embodiment of the invention.

FIG. 1A presents an electronic parking permit unit 10 in accordance with an embodiment of the present invention. In this figure, the electronic parking permit unit 10 is placed adjacent, preferably, with its front face to the front window 9 of a motor vehicle 11. According to an embodiment of the invention, the electronic parking permit unit 10 is portable and has relatively small physical dimensions, thus, if required it can be easily carried by hand, e.g., unit 10 can have typical dimensions of 100 mm×65 mm×14 mm.

The motor vehicle 11 is parked in a designated parking space 13 near a pavement 12. The position of the parking permit unit 10 may vary, e.g. parking permit unit 10 can be placed to a side window, back window, to the rearview-mirror or any preferable location as long as it is in a comfortable visible place to be seen from most points of view around the vehicle.

FIG. 1B schematically illustrates a magnification of the parking permit unit 10, according to an embodiment of the invention. Parking permit unit 10 may contain any suitable information regarding the parking permission and/or the owner of such permit unit, as usually displayed on permit tags. In this embodiment, the main features of parking permit unit 10 comprises a wheelchair symbol 15 (or any other symbol which represents a universal handicapped symbol), a display unit 17, an identification label 14 (either electronic or printed sticker), a state indicator light 16, a power plug 18, a communication connector hub 19 (e.g., a USB plug) and a biometric identification module 22 (shown in FIG. 2D) further features and optional features of unit 10 are shown hereinafter with respect to FIGS. 2B-2E.

Preferably, but not limitatively, the wheelchair symbol 15 is impressed into the front face 8 in such manner that when the parking permit unit 10 is activated, the light source 16 (FIG.

2E) illumination could be seen, since light can pass through the slits created by the impressed wheelchair symbol 15.

Figure 2A:
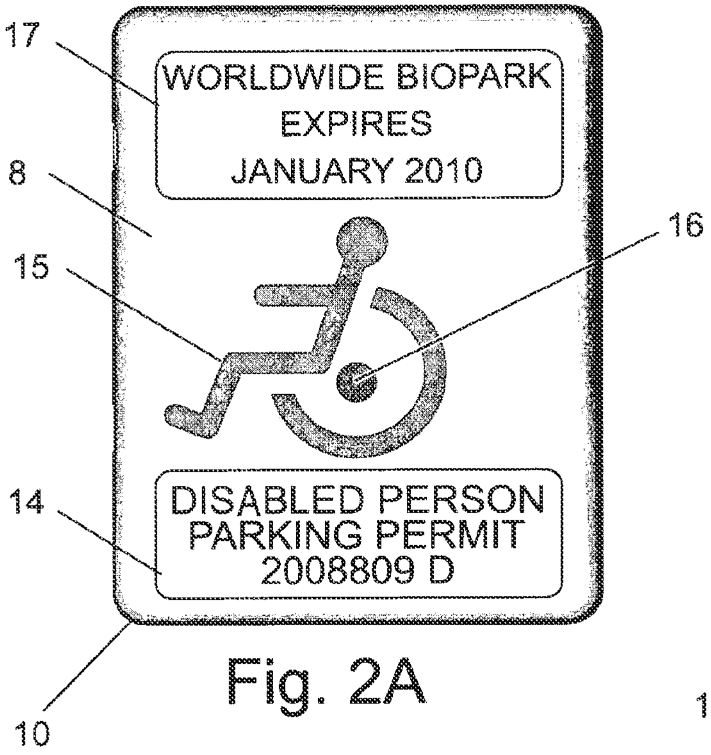
FIGS. 2A-2F are drawing plate of the electronic parking permit portable unit, according to an embodiment of the invention.
Figure 2B:
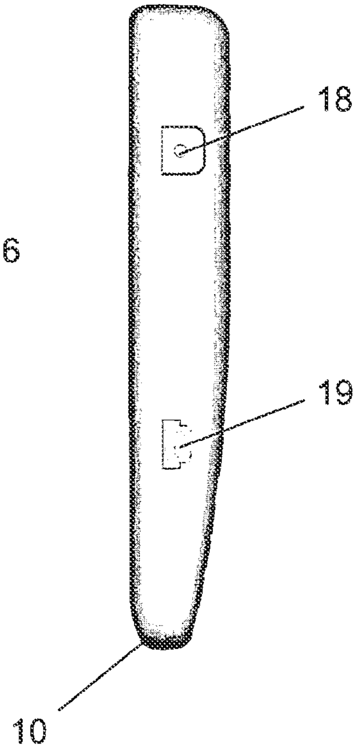
Figure 2C:
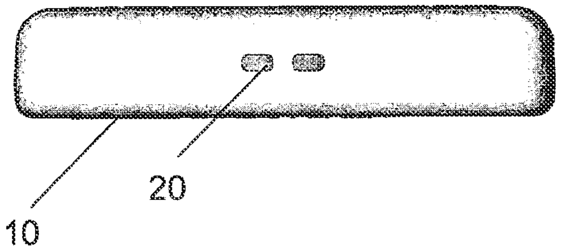
Figure 2D:
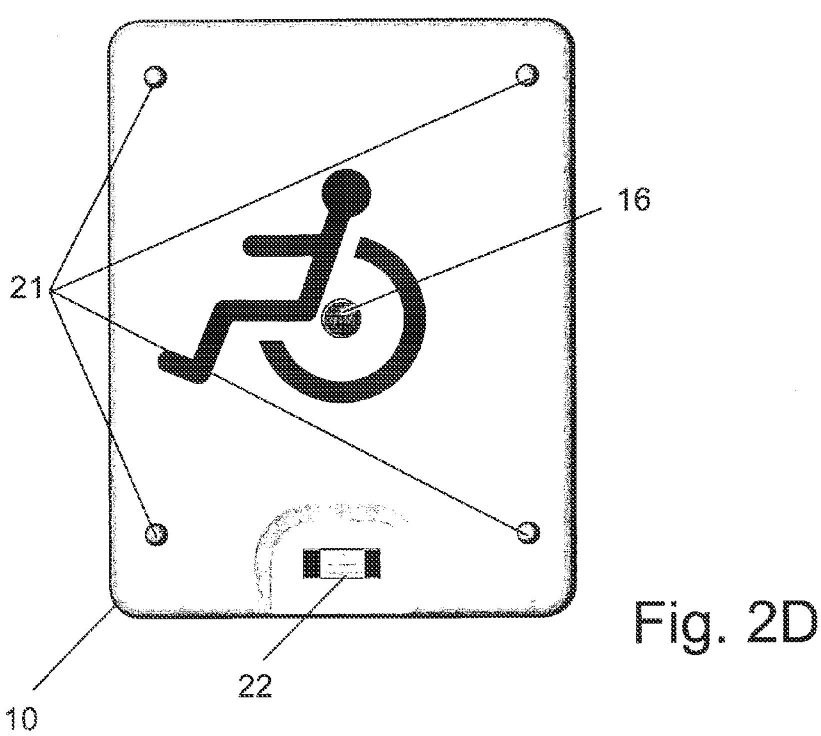
Figure 2E:
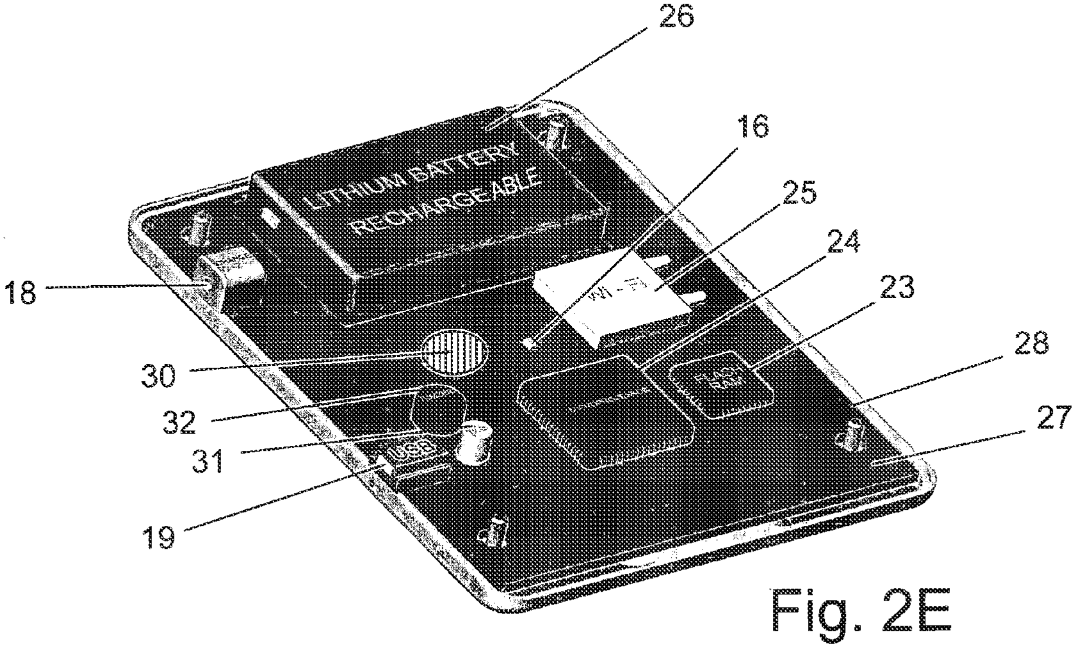

FIGS. 2A-2E illustrate the drawing plate for the parking permit unit 10. FIGS. 2A-2C illustrate the front, side and top views of the parking permit unit 10, respectively. FIG. 2D illustrates a rear view of the parking permit unit 10. Indicator light 16 and tightening elements 21 are evident, as well as a finger print plane detector portion (i.e., finger print sensor) of biometric identification module 22 (FIG. 2D). FIG. 2E discloses the basic elements inside the parking permit unit 10, where the following elements are evident: the circuit board 27; the casing 28; the indicator light 16; the power source, such as rechargeable battery unit 26; the communication connector hub 19; a power plug 18 (optional); a processing unit 24 and its corresponding memory unit 23; and a communication module 25.

Preferably, but not limitatively, unit 10 further comprises a Radio Frequency (RF) identification tag 30; a motion detector 31, and a speaker 32. Motion detector 31 is incorporated in order to assure that the parking permit unit 10 is operated for actual parking and is not abused. Once the motion detector 31 detects movement after said parking permit unit 10 was activated and its user got approved, it will automatically deactivate said parking permit unit 10. RF identification tag 30 is incorporated in order to enable the absolute identification and authorization of said parking permit unit 10 by an authorized law-enforcement officer, via suitable RF communication means, and to certify that the parking permit unit 10 is genuine.

Figure 2F:
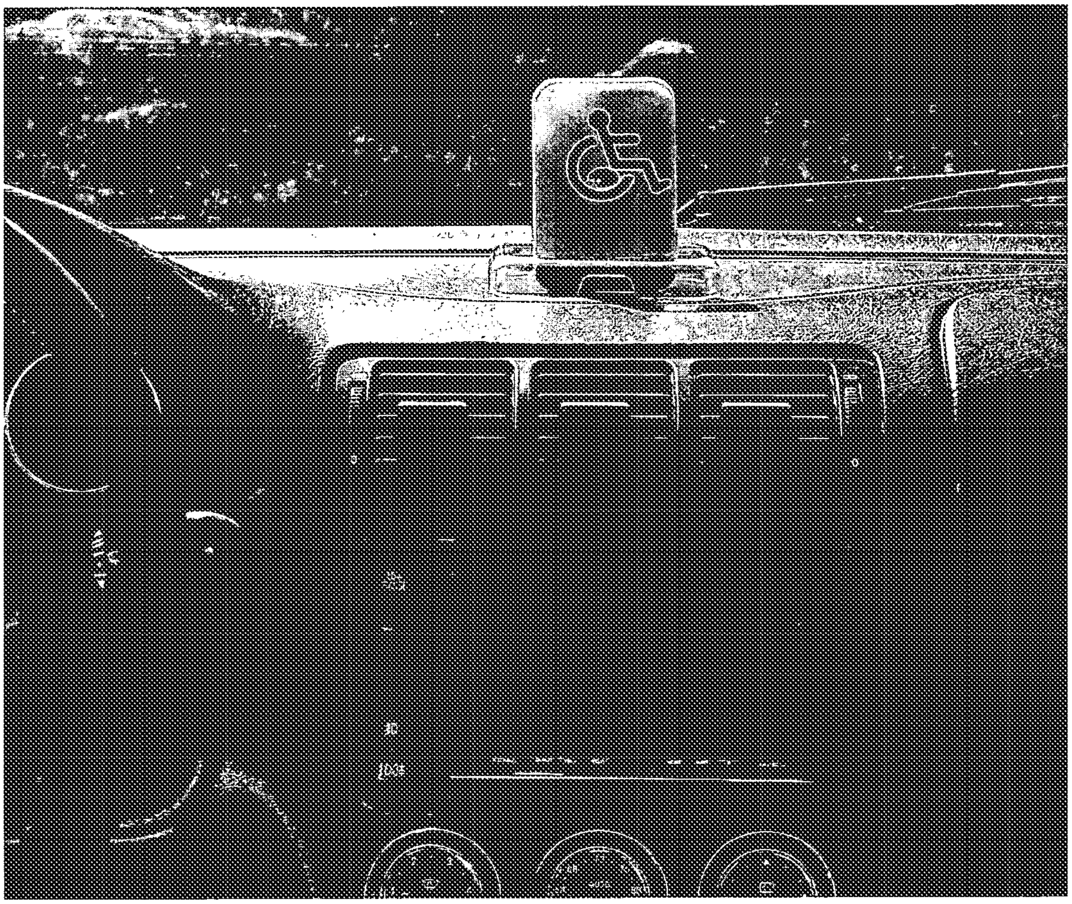

Unit 10 can be attached to inner side of a vehicles window by any suitable attaching or hanging means, such as by slots 20 (FIG. 2C) which allows the parking permit unit 10 to be hanged from the rearview mirror using a suitable cord. Alternatively, the parking permit unit may be mounted using an assigned stand 33 (sown in FIG. 2F) that can be used also as carrier.

According to an embodiment of the invention, the biometric identification module consists of a finger print sensor 22, but of course it can be any other biometric detector means of absolute identification of a user, e.g. voice signature, iris signature etc. as are known to a person skilled in the art. Data is initially stored in said parking permit unit 10 using either the communication means or directly in service stations operated by the authorities. Said electronic parking permit unit 10 is operated by DC voltage from said rechargeable battery unit 26, and preferably, but not limitatively, a backup battery (not shown) is installed in said parking permit unit 10. The user activates said parking permit unit 10 via the finger print sensor 22, which is pre-loaded with the authorized user's data in memory module 23. Once said parking permit unit 10 is activated, said state indicator light 16 is turned on (illuminates). Said processor unit 24 compares the activating user data set with the data set stored upon memory unit 23 and performs a decision, using standard comparison algorithms, upon approval or disapproval resulting in triggering said wheel chair symbol 15 and display unit 17. The activating state will be 'on' or 'approved use', if there is a positive match, and will result in a specific electronic display message on display unit 17. The deactivating state will be 'off' or 'disapproved use' if there is no match, and will result in different display message on display unit 17. The parking permit unit 10 periodically transmits secured ID data (for example, the name of the disabled person and his authorization number) to its close vicinity. The transmitted ID data may then be received and verified by the parking officer. The municipal parking authorities will be able to read and decode the transmitted secured data, for further verification and authentication, as long as the parking permit unit is active.

In this manner, once a parking officer is inspecting a vehicle he can easily identify whether an authorized person is displaying the parking permit or not. As an option, movement sensor, such as motion detectors 31 (FIG. 2E), implemented in the unit 10 will terminate the operation of unit 10 when the vehicle 11 is not in a parking position anymore, or if the permit unit 10 is moved or handed to other unauthorized person after pre-activated by the authorized person.

According to an embodiment of the invention, a movement detector is incorporated into parking permit unit 10, in such fashion that once the parking permit unit 10 is activated and the movement detector is detecting movement of more than a predetermined period of time, then unit 10 will be turned off (i.e., deactivated mode). Preferably, the movement sensor terminates the operation of unit 10 after sensing a continuous movement over a relatively short predetermined period of time (e.g., 5 seconds).

Another embodiment of said parking permit unit 10 discloses a remote server, having a communication means, such as internet, and a database of all parking authorized disabled people and all parking spaces. Once a user is activating said parking permit unit 10, the communication module 25, preferably a cellular or other wireless module, is contacting said remote server and transferring the user data and actual position using a GPS (Global Positioning System) or GALILEO (Global Navigation Satellite System) module. The remote server in turn, compares received data with its database on designated parking places and on authorized people to use it and provides the permit unit 10 with approval or disapproval signal. Once approval is given, the system will trigger the plurality of light sources to emit light and the state of unit 10 will be 'on', and if there is a disapproval signal, the plurality of light sources remains un-triggered and the state will be 'off'. In this manner, once a parking officer or a policeman inspects a vehicle, he can easily identify whether an authorized person is displaying the parking permit or not.

According to an embodiment of the invention, each electronic parking permit tag has an electronic authentication address for local or remote recognition. The inspection of authorities on the tag can be done by a person on the ground, such as a parking officer, by aerial means via satellites, on the tag software (which is highly secured against intrusion and copying) and by electronic ID. For example, the parking permit unit 10 may be programmed to periodically transmit secured ID data (for example, the name of the disabled person and his authorization number) to its close vicinity. The transmitted ID data may then be received and verified by the parking officer. High security is also possible due to the fact the all the data and software required for the operation of the parking permit unit 10 are burned into its inherent memory and cannot be re-programmed. In addition, the municipal parking authorities will be able to read and decode the transmitted secured data, for further verification and authentication, as long as the parking permit unit is active.

According to another embodiment, the data in the parking permit unit 10 may also be used for identifying drivers that parked particular vehicles in particular places. This feature may be important for improving security, when desired. Also, the personal details of drivers that activated the parking permit unit 10 may also be used for controlling authorized persons. The municipal authorities may be allowed to program user specific permits that can be stored in the parking permit unit 10, such as specific parking home and office addresses or addresses of shopping locations for a specific user.

According to a further embodiment, the data in the parking permit unit 10 may also be used for controlling the identity of one or more authorized persons that escort a disabled person. These authorized persons may be for example, his close relatives who drive the vehicle for him, or a caregiver (in case of a person that cannot activate the parking permit unit, for example). In this case, the biometric data of these authorized persons will be stored in the parking permit unit 10, as well. This way, a situation when other friends of the disabled person will use the parking permit unit 10 will be avoided.

The above features of the parking permit unit 10 allow using it legally, independent of the identity of the vehicle in which it is activated. In fact, any vehicle that is used to transport the disabled person can use it in a legal and controlled manner. For example, even if a taxi is used for transportation, its parking permission is induced on the same taxi. This independency may also be advantageous when leased or rented cars are used by the disabled person.

The system proposed by the present invention discloses a solution to the problem of preventing the abuse and forging of handicap parking permits for vehicles and avoiding frauds. The tag proposed by the present invention is not location based and does not require extensive data communication with remote computers. In order to achieve its goal, the tag proposed by the present invention requires only simple and basic short-range communication for transmitting a verification string (with a parking officer), free of charge. In addition, the tag proposed by the present invention has injective identification capability, since it uses true biometric data of the handicapped person who owns the tag, so as to verify that he is present when the vehicle is parking. The tag proposed by the present invention is directed to the handicapped person and not to the vehicle that the handicapped person is using. This way, a handicapped person who took a taxi (or any other vehicle) to his destination may activate the tag in order to permit the taxi to become a vehicle which is authorized to park in a parking spot that is preserved for handicapped only, as long as the handicapped person is present in the parking process. This tag is actually a stand alone compact and portable device, which can be easily moved between different vehicles that are used to serve a particular handicapped person.

While one embodiment of the invention have been described by way of illustration, it will be apparent that the invention can be carried into practice with many modifications, variations and adaptations, and with the use of numerous equivalents or alternative solutions that are within the scope of persons skilled in the art (such as assured identification of vehicles that move from a specific restricted area to another restricted area), without departing from the spirit of the invention or exceeding the scope of the claims.

The invention claimed is:

1. A portable electronic parking permit tag for vehicles transporting disabled persons and for preventing forgery and abuse of use, comprising:

a) a casing placeable in a vehicle so that a universal disabled person symbol and parking authorization provided with said casing are visible from around the vehicle;

b) a memory module for storing data regarding the person or persons allowed to activate said tag including name and authorization number, in which all of said stored data is burned into said memory module to prevent forgery and includes biometric information of each of the said person or persons;

c) a biometric identification module for obtaining biometric data of the person trying to activate said tag;

d) at least one display unit for indicating the status of said tag, whether activated or deactivated;

e) a processing unit for comparing said obtained biometric data with said stored data and for triggering the tag status to an activated status if said obtained biometric data and said stored data match;

f) a movement detector for deactivating said tag upon sensing movement of said tag, after being activated, to prevent unlawful usage of said tag;

g) a short-range transmitter for periodically transmitting secured data related to the name and authorization number of the disabled person who activated said tag, wherein said short-range transmitted data is receivable in an unmediated way by a mobile communication device carried by a parking officer and is locally verifiable by said mobile communication device to provide parking authorization of said tag; and h) a power source for powering said tag.

2. A tag according to claim 1, in which some or all of the data is coded.

3. A tag according to claim 1, in which the stored data in the memory module further includes personal details and parking permission for each person allowed to activate the tag.

4. A tag according to claim 1, in which the power source for powering said tag is an independent battery, a rechargeable battery, a plug through which power is received from an external power source, or any combination thereof.

5. A tag according to claim 4, in which the external power source is the battery of the vehicle.

6. A tag according to claim 1, in which the memory module is a flash memory.

7. A tag according to claim 1, in which the at least one display unit displays information regarding the person who activated said tag and the corresponding parking authorization.

8. A tag according to claim 7, in which the information is displayed electronically according to the data stored in the memory module.

9. A tag according to claim 1, in which the universal disabled person symbol is printed or scribed on a faceplate of said tag.

10. A tag according to claim 1, which is an RF identification tag.

11. A parking permit method for preventing forging and abuse of a parking tag, comprising:

a) storing data regarding the person or persons allowed to activate said tag and that is independent of the vehicle identification, in a memory module embedded within said parking tag including name and authorization number, wherein all of said stored data is burned into said memory module to prevent forgery and includes biometric information of each of said person or persons; said tag is placeable in the vehicle so that a universal disabled person symbol and parking authorization provided on said to are visible from around the vehicle;

b) obtaining biometric data of the person trying to activate said tag via a biometric identification module in said parking tag;

c) comparing said obtained biometric data with said stored data;

d) triggering a tag status to an activated status in said parking tag if said obtained biometric data and said stored data match, wherein said tag is operated via a power source;

e) periodically transmitting by said parking tag secured short-range data related to the name and authorization number of the person or persons allowed to activate said tag;

f) displaying the status of said tag, whether activated or deactivated;

g) receiving in an unmediated way said short-range transmitted data by a mobile communication device of a parking officer and locally verifying parking authorization of said tag;

and h) deactivating said tag upon sensing movement of said tag after being activated indicative of completion of a parking session, to prevent unlawful usage of said tag.

12. A method according to claim 11, wherein the stored data in the memory module further includes personal details and parking permission for each person allowed to activate said tag.

13. A method according to claim 11, wherein the tag is deactivated by a movement detector.

14. A method according to claim 11, wherein the power source is an independent battery, rechargeable battery, a plug through which power is received from an external power source, or any combination thereof.

15. A method according to claim 14, wherein the external power source is a battery of the vehicle.

16. A method according to claim 11, wherein the memory module is a flash memory.

17. A method according to claim 11, further comprising displaying information regarding the person who activated said tag and the corresponding parking authorization.

18. A method according to claim 17, wherein the information is displayed electronically according to the data stored in the memory module.

19. A method according to claim 17, wherein the information is printed or scribed on a faceplate of said tag.

20. A method according to claim 11, further comprising allowing communicating via an RF identification tag.

21. A system for verifying authorization to park a vehicle at a space designated for disabled persons, comprising:

a) a portable electronic parking permit tag for the vehicle transporting disabled persons and for preventing forgery and abuse of use, comprising:

i) a casing placeable in the vehicle so that a universal disabled person symbol and a parking authorization provided with said casing are visible from around the vehicle;

ii) a memory module for storing data regarding the person or persons allowed to activate said tag including name and authorization number, in which all of said stored data is burned into said memory module to prevent forgery and includes personal biometric information of each of said person or persons;

iii) a biometric identification module for obtaining biometric data of the person trying to activate said tag;

iv) at least one display unit for indicating the status of said tag, whether activated or deactivated;

v) a processing unit for comparing said obtained biometric data with said stored data and for triggering the tag status to an activated status if said obtained biometric data and said stored data match;

vi) a movement detector for deactivating said tag upon sensing movement of said tag, after being activated, to prevent unlawful usage of said tag;

vii) a short-range transmitter for periodically transmitting secured data related to the name and authorization number of the disabled person who activated said tag; and viii) a power source for powering said tag; and b) a mobile communication device carried by a parking officer, said mobile communication device being configured to verify parking authorization of said tag and comprising a memory device in which is stored a local database of parking authorized disable people, wherein said short-range transmitted data is receivable and locally verifiable in an unmediated way by said mobile communication device.

22. A system according to claim 21, wherein the at least one display unit comprises a plurality of light sources each of which is illuminated to a different color in accordance with the activation status of the tag.

23. A tag according to claim 1, wherein the at least one display unit comprises a plurality of light sources each of which is illuminated to a different color in accordance with the activation status of the tag.

24. A tag according to claim 1, wherein the movement detector is also operable to cause the tag to become deactivated upon sensing continuous movement of the vehicle for more than a predetermined period of time.

25. A method according to claim 11, wherein the tag is also deactivated upon sensing continuous movement of the vehicle for more than a predetermined period of time.

* * * * *